(12) United States Patent
Vasseur et al.

(10) Patent No.: US 9,231,965 B1
(45) Date of Patent: Jan. 5, 2016

(54) TRAFFIC SEGREGATION IN DDOS ATTACK ARCHITECTURE

(71) Applicant: Cisco Technology, Inc., San Jose, CA (US)

(72) Inventors: Jean-Philippe Vasseur, Saint Martin d'Uriage (FR); Andrea di Pietro, Lausanne (CH); Javier Cruz Mota, Assens (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/339,255

(22) Filed: Jul. 23, 2014

(51) Int. Cl.
*G06F 11/00* (2006.01)
*H04L 29/06* (2006.01)
*G06F 12/14* (2006.01)
*G06F 7/04* (2006.01)

(52) U.S. Cl.
CPC ........ *H04L 63/1416* (2013.01); *H04L 63/1458* (2013.01)

(58) Field of Classification Search
CPC . G06F 21/55; H04L 63/1433; H04L 63/1458; H04L 63/1408; H04L 63/144; H04L 2463/141
See application file for complete search history.

(56) References Cited

U.S. PATENT DOCUMENTS

| | | | |
|---|---|---|---|
| 7,234,168 B2 | 6/2007 | Gupta et al. | |
| 7,690,037 B1 * | 3/2010 | Hartmann | 726/23 |
| 7,788,718 B1 | 8/2010 | Fei et al. | |
| 8,423,645 B2 | 4/2013 | Jeffries et al. | |
| 8,635,703 B1 * | 1/2014 | Belani et al. | 726/25 |
| 8,745,737 B2 * | 6/2014 | Thomas et al. | 726/22 |
| 2008/0270601 A1 * | 10/2008 | Ishikawa | 709/224 |
| 2009/0254989 A1 * | 10/2009 | Achan et al. | 726/22 |
| 2010/0138925 A1 * | 6/2010 | Barai et al. | 726/25 |
| 2010/0169971 A1 * | 7/2010 | Raviv | 726/23 |
| 2010/0212005 A1 | 8/2010 | Eswaran et al. | |
| 2011/0072515 A1 | 3/2011 | Park et al. | |
| 2011/0167493 A1 * | 7/2011 | Song et al. | 726/23 |
| 2011/0194698 A1 * | 8/2011 | Asano et al. | 380/282 |
| 2012/0284793 A1 * | 11/2012 | Steinbrecher et al. | 726/23 |
| 2012/0307624 A1 * | 12/2012 | Vasseur et al. | 370/221 |

* cited by examiner

*Primary Examiner* — Dede Zecher
*Assistant Examiner* — Trang Doan
(74) *Attorney, Agent, or Firm* — Parker Ibrahim & Berg LLC; James M. Behmke; Stephen D. LeBarron

(57) ABSTRACT

In one embodiment, a particular node in a network determines information relating to network attack detection and mitigation from a local machine learning attack detection and mitigation system. The particular node sends a message to an address in the network indicating capabilities of the local machine learning attack detection and mitigation system based on the information. In response to the sent message, the particular node receives an indication that it is a member of a collaborative group of nodes based on the capabilities of the local machine learning attack detection and mitigation system being complementary to capabilities of other machine learning attack detection and mitigation systems. Then, in response to an attack being detected by the local machine learning attack detection and mitigation system, the particular node provides to the collaborative group of nodes an indication of attack data flows identified as corresponding to the attack.

24 Claims, 10 Drawing Sheets

TRAFFIC SEGREGATION IN DDOS ATTACK ARCHITECTURE

TECHNICAL FIELD

The present disclosure relates generally to computer networks, and, more particularly, to traffic segregation in a DDoS attack architecture.

BACKGROUND

Enterprise networks are carrying a very fast growing volume of both business and non-business critical traffics. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

One type of network attack that is of particular concern in the context of a computer network is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. The detection of DoS attacks is particularly challenging when network resources are limited, such as in the case of a low power and lossy network (LLN).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
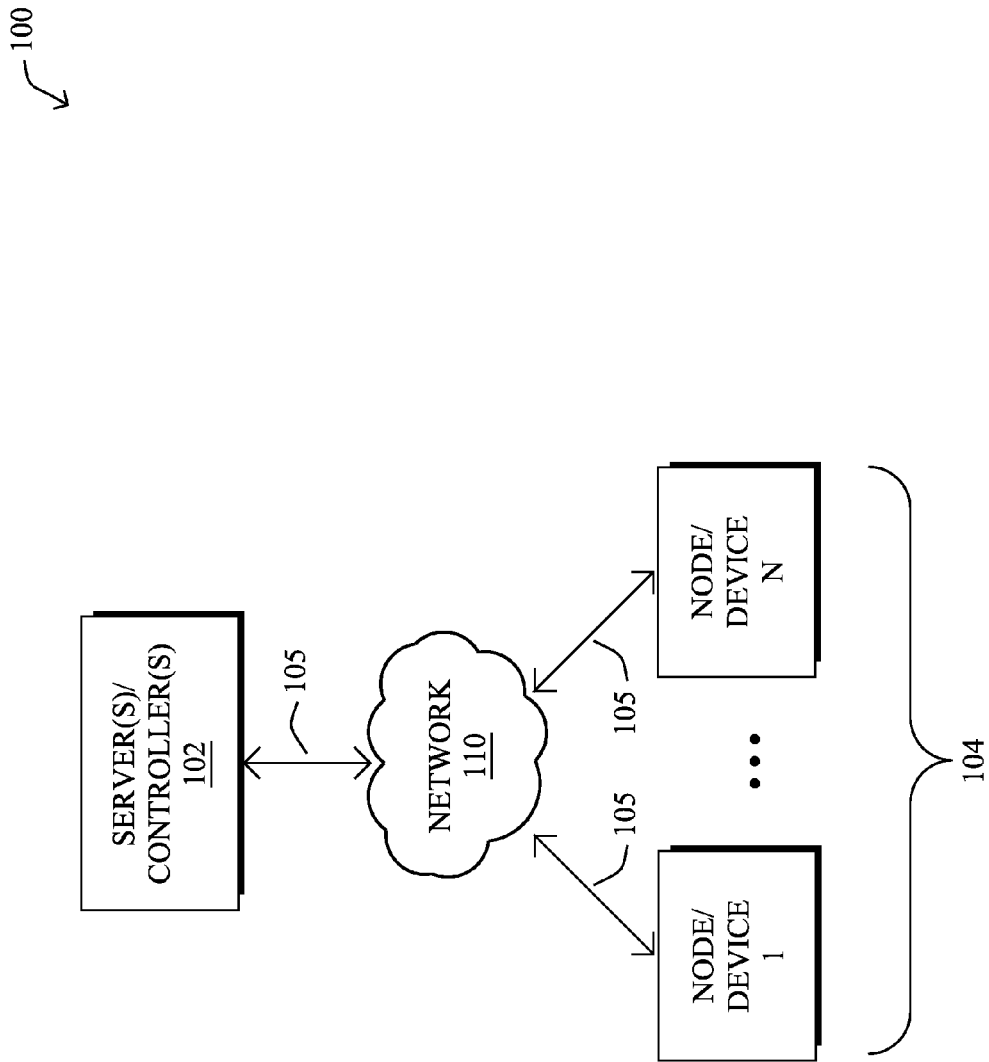
FIG. 1 illustrates an example communication network.

According to one or more embodiments of the disclosure, a particular node in a network determines information relating to network attack detection and mitigation from a local machine learning attack detection and mitigation system. The particular node may send a message to an address in the network indicating capabilities of the local machine learning attack detection and mitigation system based on the information. In response to the sent message, the particular node receives an indication that it is a member of a collaborative group of nodes along with one or more other nodes in the network based on the capabilities of the local machine learning attack detection and mitigation system (local to the particular node) being complementary to capabilities of one or more other machine learning attack detection and mitigation systems local to the one or more other nodes. Then, in response to an attack being detected by the local machine learning attack detection and mitigation system, the particular node provides to the collaborative group of nodes an indication of attack data flows identified as corresponding to the attack. Thus, the one or more other machine learning attack detection and mitigation systems local to the one or more other nodes are enabled to assist the particular node in mitigating the attack.

Further, according to one or more embodiments of the disclosure, a centralized entity node in a network receives messages from a plurality of nodes in the network indicating capabilities of a machine learning attack detection and mitigation system local to each respective node. In response to the received messages, the centralized entity node computes a collaborative group of nodes based on a determination that the capabilities of the machine learning attack detection and mitigation systems local to the collaborative group of nodes are complementary to one another. Thus, the machine learning attack detection and mitigation systems local to the collaborative group of nodes are enabled to assist one another in mitigating attacks in the network. Then, the centralized entity node sends a message to the collaborative group of nodes identifying each node that is a member within the collaborative group of nodes.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer system 100 illustratively comprising one or more server(s)/controller(s) 102 and one or more nodes/devices 104 (e.g., a first through nth node/device) that are interconnected by various methods of communication. For example, links 105 may be wired links or shared media (e.g., wireless links, PLC links, etc.) that illustratively form a network 110. Those skilled in the art will understand that any number of nodes, devices, links, etc. may be used in computer system 100, and that the view shown herein is for simplicity. Also, those skilled in the art will further understand that while the network is shown in a certain orientation, system 100 is merely an example illustration that is not meant to limit the disclosure.

In general, server(s)/controller(s) 102 provide some form of control over nodes/devices 104 and, more generally, over the operation of network 110. For example, servers/controllers 102 may include, but are not limited to, path computation engines (PCEs), network controllers, network management systems (NMSs), policy engines, reporting mechanisms, or any other form of device or system that provides some degree of global or localized control over other devices in the network.

Nodes/devices 104 may include any form of networking device used to generate, forward, receive, etc., traffic within network 110. For example, nodes/device 104 may include, but are not limited to, routers, switches, computers, or the like.

Data packets (e.g., traffic and/or messages sent between the devices/nodes) may be exchanged among the nodes/devices of the computer system 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

In some embodiments, network 110 may be or may include a WAN, LAN, service provider network, customer edge network, multi-protocol label switched (MPLS) network, IP network, wireless network, mesh network, shared media network, virtual private network (VPN), or any other form of computing network. In one embodiment, network 110 may be, or may include, a Low Power and Lossy Network (LLN). LLNs (e.g., certain sensor networks), may be used in a myriad of applications, such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnections are constrained: LLN routers typically operate with constraints, e.g., processing power, memory, and/or energy (battery), and their interconnections are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 2:
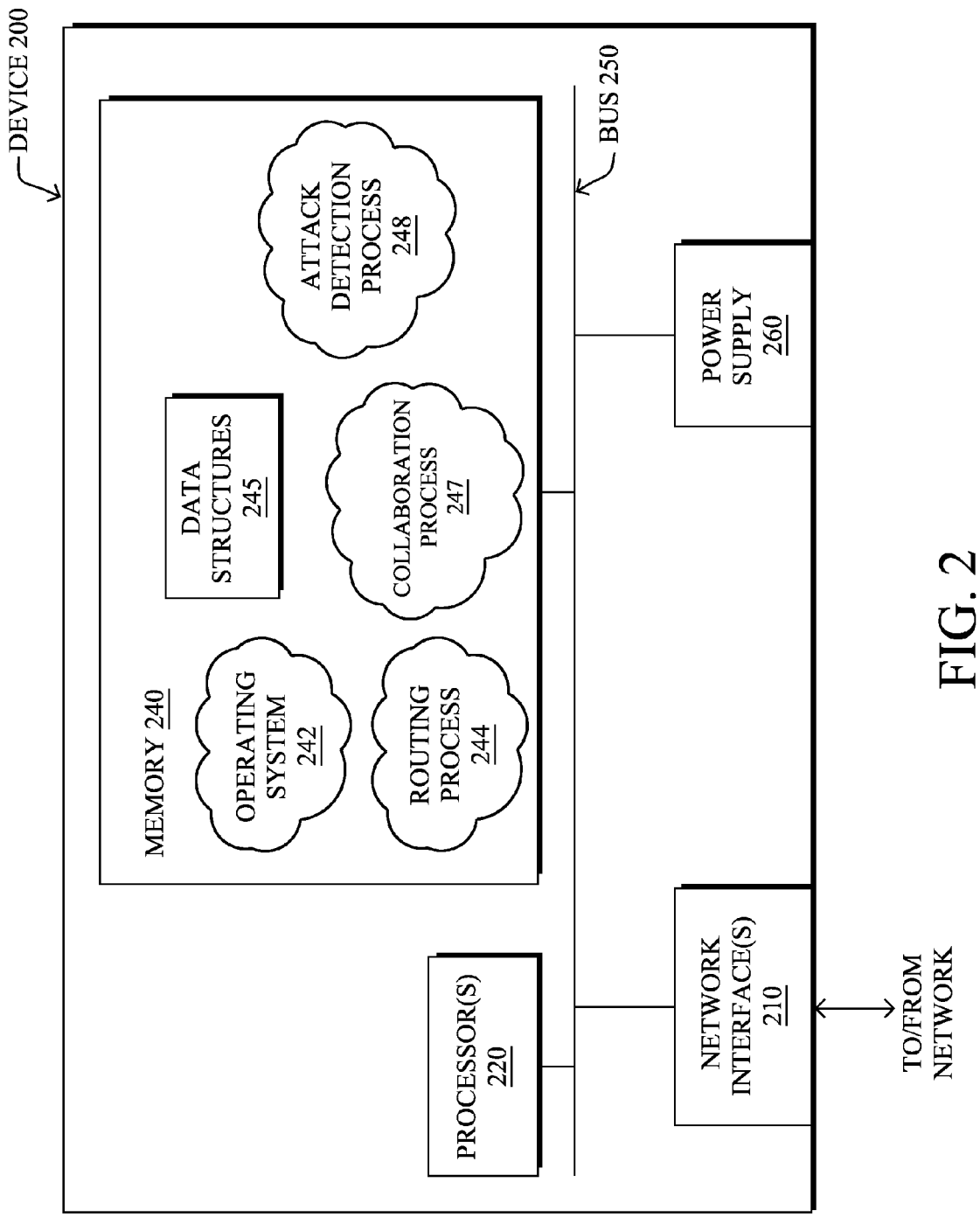
FIG. 2 illustrates an example network device/node.

FIG. 2 is a schematic block diagram of an example node/device 200 (e.g., a server/controller 102, a node/device 104, etc.) that may be used with one or more embodiments described herein, e.g., as any of the devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a collaboration process 247, and/or an attack detection process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Attack detection process 248 includes computer executable instructions executed by the processor 220 to perform various functions, such as attack detection and reporting. In various embodiments, attack detection process 248 may use machine learning to determine whether an attack and/or a specific type of attack is detected. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data. Accordingly, attack detection process 248 may be an attack detection classifier that classifies network traffic or conditions into either an "attack" category or a "normal operation" category, based on learned behavior of the network. In some implementations, attack detection process 248 may also be configured to use additional categories (e.g., classification labels), such as labels indicative of specific types of attacks.

As also noted above, learning machines (LMs) are computational entities that rely on one or more machine learning processes for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Artificial Neural Networks (ANNs) are a type of machine learning technique whose underlying mathematical models that were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Accordingly, an ANN may be trained to identify deviations in the behavior of a network that could indicate the presence of a network attack (e.g., a change in packet losses, link delays, number of requests, etc.). In some cases, ANN classifiers may be hierarchical in that a more powerful classifier verifies a conclusion reached by a lower-powered classifier. Other machine learning techniques that may be used in an attack detection classifier may include, but are not limited to, support vector machines (SVMs), naïve Bayesian models, decision trees, and the like.

Attack detection process 248 may also employ anomaly detection techniques, to classify network conditions as being indicative of an attack. Anomaly Detection (AD) is a data mining and machine learning technique that entails detecting, from a flow of data, the elements of the flow that do not follow the same pattern as the other flow elements. In particular, AD techniques may be used to construct a model of normal behavior and may use the model to detect data points that are unlikely to fit the model. Example AD techniques include, but are not limited to, k-NN techniques, one-class SVM techniques, replicator NN techniques, etc. Notably, such techniques may be used by learning machine process 248 to detect previously unseen forms of attacks.

In further embodiments, attack detection process 248 may use clustering techniques, to detect a potential network attack. Clustering denotes a family of techniques in which the objective is to group objects according to some (usually predefined) notion of similarity. For instance, clustering is a very popular technique used in recommender systems (RS) for grouping objects that are similar in terms of people's tastes. This way, the system can propose new products that the user will like with a high probability, based on previous choices of this particular user. Typical clustering algorithms are k-means, DBSCAN or Mean-Shift, among others.

Collaboration process 247, as described in greater detail below, includes computer executable instructions executed by the processor 220 to perform functions that include collaboratively segregating attack traffic in a computer network, such as network 100. The collaboration process 247 may operate in conjunction with the attack detection process 248.

Figure 3A:
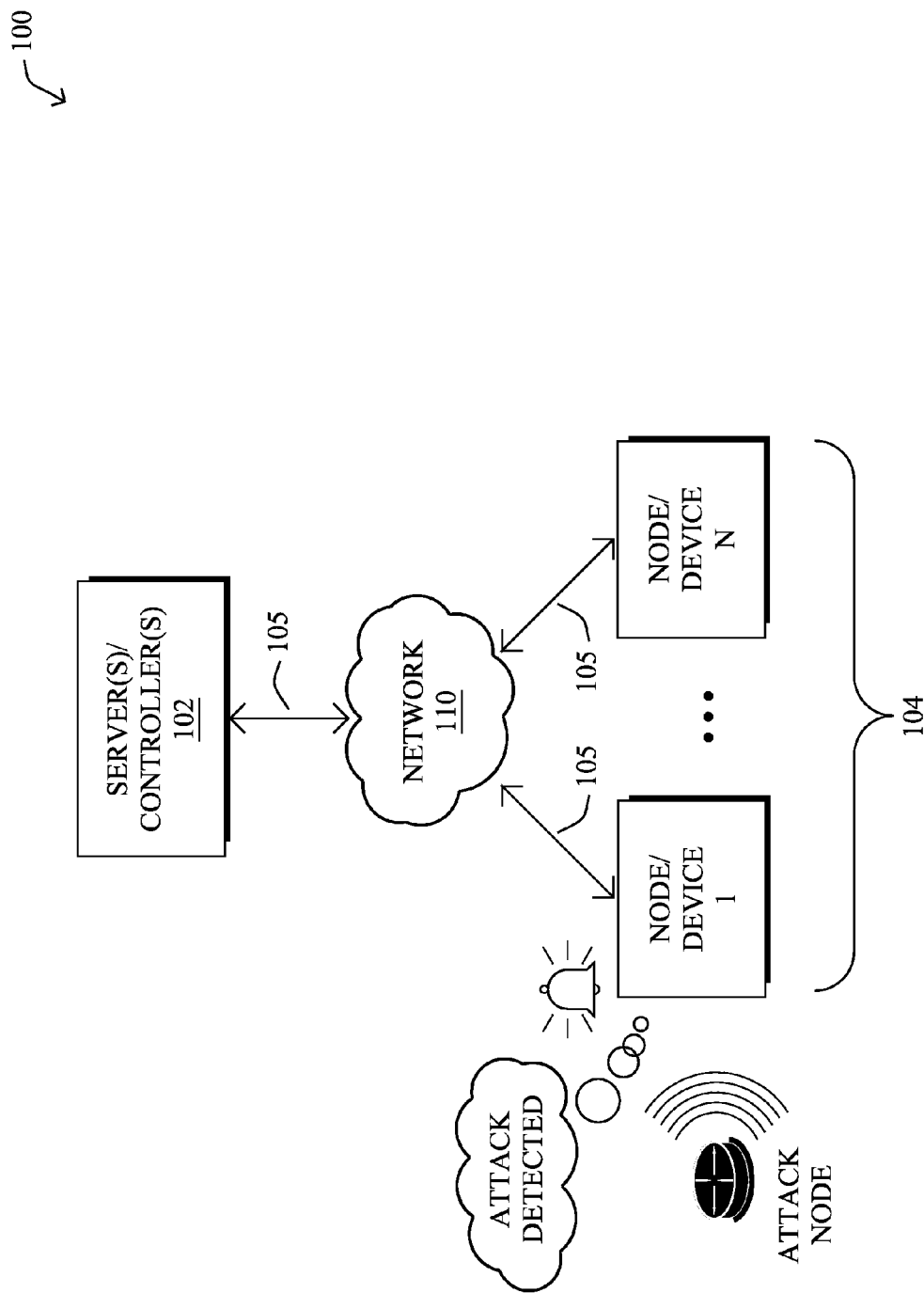
FIGS. 3A-3B illustrate an example of a network attack being detected.
Figure 3B:
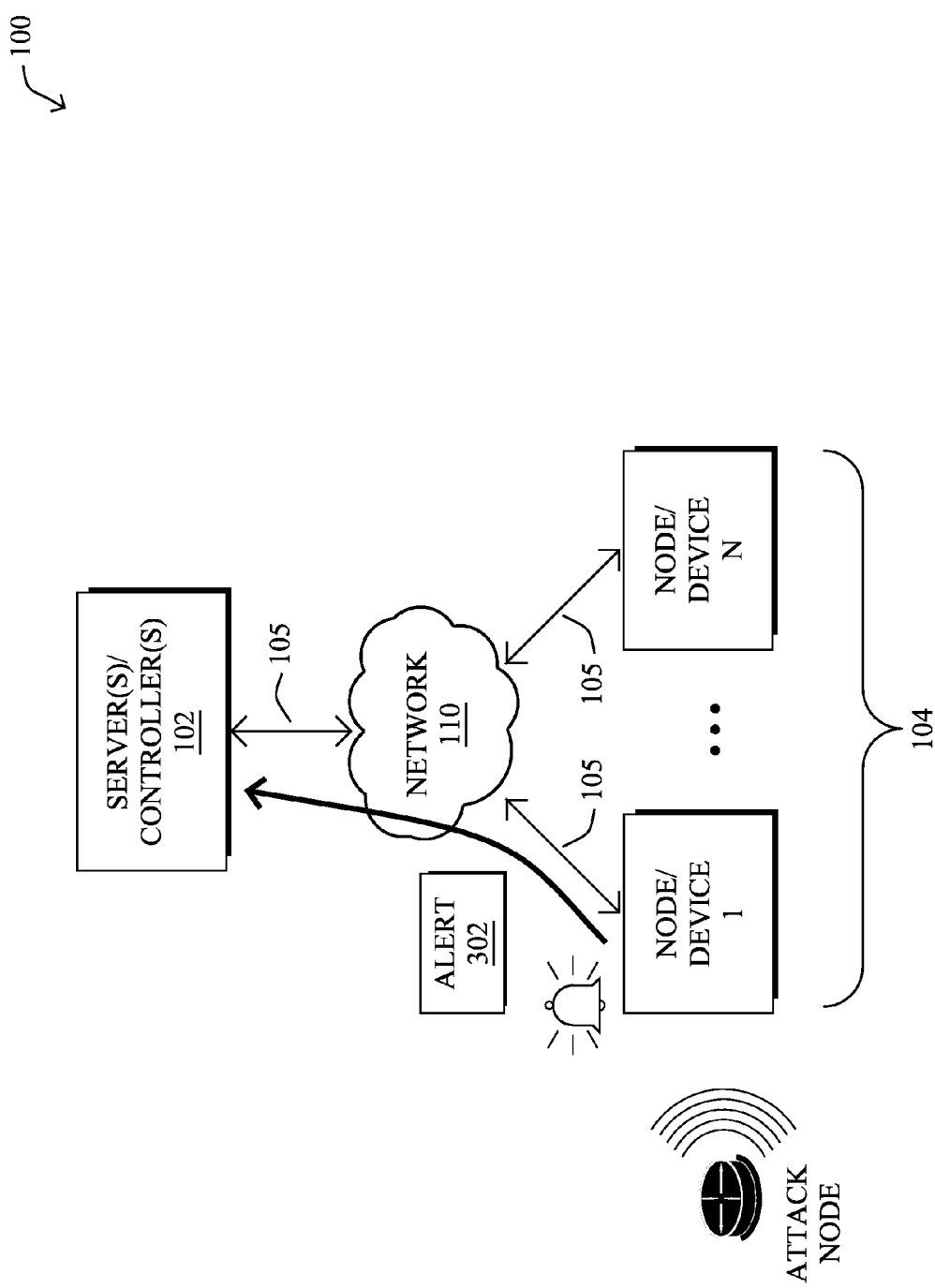

FIGS. 3A-3B illustrate an example of a network attack being detected, according to various embodiments. As shown, assume that a particular node/device 104 is under attack from an attack node. During a DoS attack, for example, the attack node may attempt to flood the node/device with request traffic (e.g., SYN flooding), thereby reducing the amount of resources available at the device/node (and potentially the network itself) for legitimate traffic. Notably, other forms of DoS attacks may attempt to send a high volume of traffic (e.g., a volume based DoS attack) and may, in some cases, be distributed DoS (DDoS) attacks.

As shown in FIG. 3A, assume that the particular node/device 104 under attack is configured to execute an attack detector process (e.g., process 248). In general, the attack detector process may be operable to observe traffic behavior and apply a label (e.g., a classification) to the observed traffic behavior. For example, the node/device 104 under attack may determine that a sharp increase in request traffic is indicative of an attack (e.g., the observed behavior may be labeled as an attack by the device's machine learning process). In such a case, as shown in FIG. 3B, the node/device 104 may initiate countermeasures, such as sending an alert 302 to one of the servers/controller 102 (e.g., to alert a network administrator), etc.

As referenced above, denial of service is a broad term for any kind of attack aiming, by any means, at making a particular service unavailable (be it a certain application running on a server or network connectivity itself). This is usually performed by bringing the target's resources to exhaustion (target resources may range from bandwidth to memory and CPU). In greater detail, a denial-of-service attack may consist of flooding a target network with hundreds of megabits of traffic (e.g., a volume-based DoS), exhausting a server state by opening a number of TCP connections (e.g., SYN flooding), or by making an HTTP server unavailable by sending it an overwhelming number of requests. An attack may be subtle and exploit well-known vulnerabilities in the target system (e.g., a large number of fragmented IP packets may exhaust the resources of a router), thus leading to attacks that are difficult to detect and mitigate.

Nowadays, denials of service attacks are mostly distributed (DDoS), meaning they are carried out by multiple sources at the same time, making it more difficult to track. In many cases botnets (i.e., armies or infected hosts spread across the network and under the control of a single master) are used for mounting DoS attacks. In addition, source addresses used for attacks can be spoofed, so that blocking an offending address is potentially useless.

DoS attacks can be easy to detect when they are brute-force (e.g., volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. As a result, machine learning techniques are particularly beneficial for learning the behavior of these attacks for detecting them before a server or an entire network becomes unavailable.

As further noted above, traffic segregation is a fundamental component of DoS/DDoS detection and mitigation, since non-brute force mitigation is only viable if the attacking flow can be flagged (e.g., attack traffic segregation). Notably, segregation of attack traffic corresponding to a DoS/DDoS attack in the network can be enhanced by utilizing a collaborative model between a set of network devices in order to increase the performance but also the speed at which segregation takes place. Indeed, current local segregation techniques may imply long convergence times of the traffic flagging techniques, thus impacting the effectiveness of the overall system.

Collaborative Traffic Segregation in a DDoS Attack Architecture

The techniques herein provide a collaborative mode of operation for a set of modules capable of flagging (i.e., segregating) traffic responsible for a DoS or DDoS attack. The first component is used for computing optimal groups of collaborative notifiers (CN) according to their capabilities (e.g., based on historical performance), their location along with the network topology, and the available resources on each CN. This leads to the dynamic creation of a publishing bus in the form of a multicast group, which can be used to exchange information about the flagged traffic. Such information is used by the LM-based attack detectors on the CNs to converge much faster in identifying the attacking traffic. Furthermore, this leads to faster mitigation, even in nodes with constrained resources, which are less capable and may not be equipped with a sophisticated segregator. In contrast with existing approaches, the disclosed embodiments specify a fully distributed and collaborative method for identifying attacking traffic in a network, such as a self-learning network (SLN). Such an approach is premised on a combination of the knowledge of the network topology and routing with distributed ML-based algorithms for performing efficient traffic segregation.

Specifically, according to one or more embodiments of the disclosure as described in detail below, a particular node in a network determines information relating to network attack detection and mitigation from a local machine learning attack detection and mitigation system. The particular node may send a message to an address in the network indicating capabilities of the local machine learning attack detection and mitigation system based on the information. In response to the sent message, the particular node receives an indication that it is a member of a collaborative group of nodes along with one or more other nodes in the network based on the capabilities of the local machine learning attack detection and mitigation system (local to the particular node) being complementary to capabilities of one or more other machine learning attack detection and mitigation systems local to the one or more other nodes. Then, in response to an attack being detected by the local machine learning attack detection and mitigation system, the particular node provides to the collaborative group of nodes an indication of attack data flows identified as corresponding to the attack. Thus, the one or more other machine learning attack detection and mitigation systems local to the one or more other nodes are enabled to assist the particular node in mitigating the attack.

Further, according to one or more embodiments of the disclosure, a centralized entity node in a network receives messages from a plurality of nodes in the network indicating capabilities of a machine learning attack detection and mitigation system local to each respective node. In response to the received messages, the centralized entity node computes a collaborative group of nodes based on a determination that the capabilities of the machine learning attack detection and mitigation systems local to the collaborative group of nodes are complementary to one another. Thus, the machine learning attack detection and mitigation systems local to the collaborative group of nodes are enabled to assist one another in mitigating attacks in the network. Then, the centralized entity node sends a message to the collaborative group of nodes identifying each node that is a member within the collaborative group of nodes.

Illustratively, the techniques described herein may be performed by hardware, software, and/or firmware, such as in accordance with the processes 244, 247 and 248, which may include computer executable instructions executed by the processor 220 (or independent processor of interfaces 210) to perform functions relating to the techniques described herein. For example, the techniques herein may be treated as extensions to conventional protocols, such as the various PLC protocols or wireless communication protocols, and as such, may be processed by similar components understood in the art that execute those protocols, accordingly.

Figure 4:
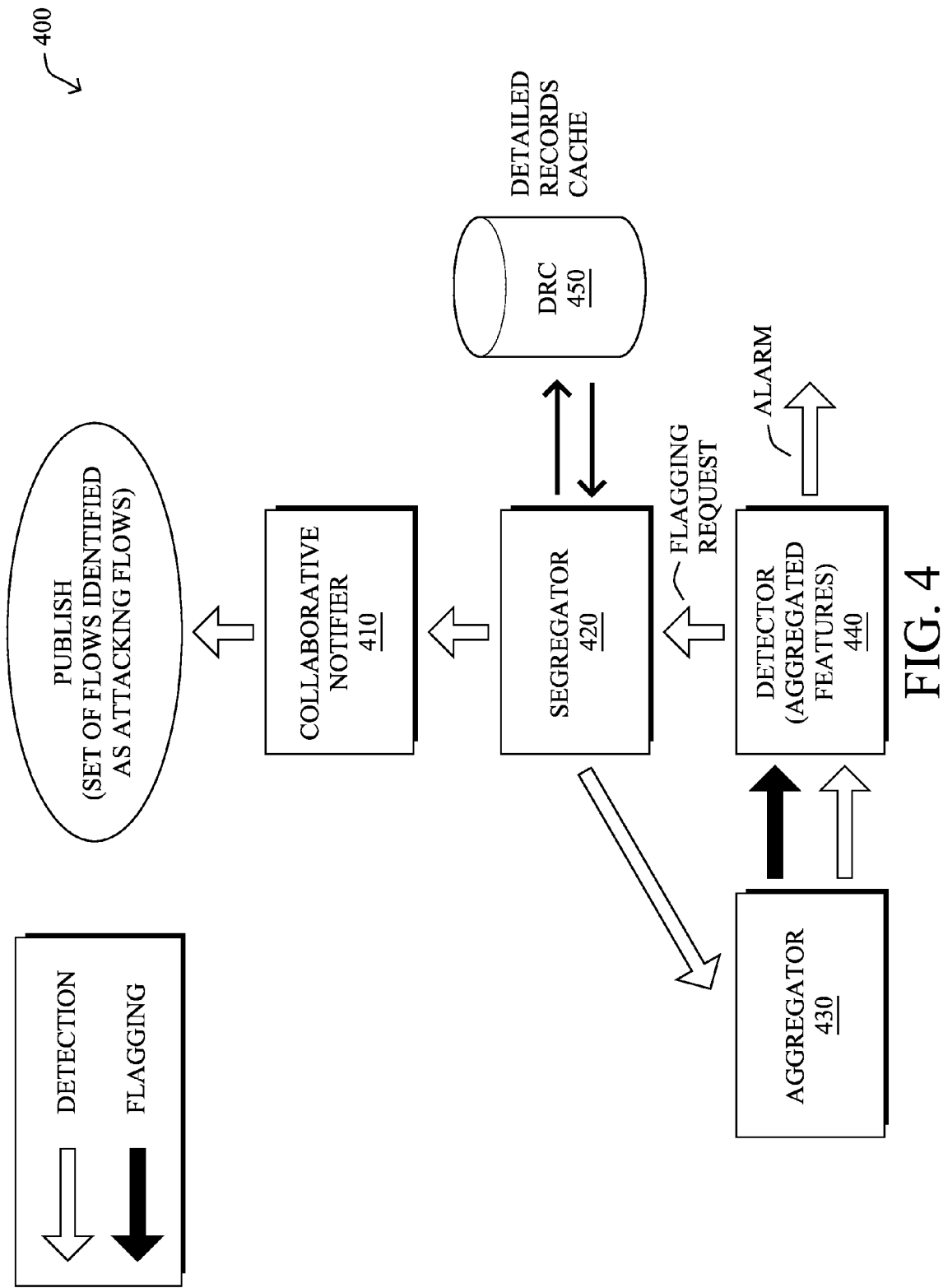
FIG. 4 illustrates an example diagrammatic representation of a DoS attack detection and mitigation architecture.

Operationally, the techniques herein provide for a collaborative model between a set of devices in the network in order to increase the performance as well as the speed at which segregation takes place in the network after detecting a potential attack. Referring to FIG. 4, the first component of this disclosure involves the Collaborative Notifier (CN) 410, a module co-hosted on a device equipped with a Machine Learning (ML) DoS attack detection and mitigation system (e.g., elements 420, 430, 440 and 450), which may be hosted on a device such as the device 200, as shown in FIG. 2, for example. The objective of the CN 410 is to interact with a local system (e.g., elements 420, 430, 440 and 450) capable of performing traffic segregation, or traffic "flagging." As is known in the art, once an attack has been detected by a DoS detector, such as the LM-based DoS attack detector 440, a traffic segregator, such as the segregator 420, performs an identification of the attacking traffic and segregation of the attacking traffic from normal traffic. Notably, any techniques suitable for DoS attack detection and mitigation may be utilized by the illustrative components in FIG. 4.

Another component of this disclosure involves the ability to discover a set of N segregators that may collaborate in their attack traffic segregation attempts, thus increasing the convergence time in flagging traffic and mitigation. The resultant collaborative mode allows segregators to speed up their convergence (e.g., identification of attacking traffic), as well as their remediation process. Indeed, if K segregators identify an attacking flow F in time T while other segregators have not yet detected or flagged the attacking traffic, this mode of collaboration can dramatically improve the efficiency of the overall system.

Figure 5:
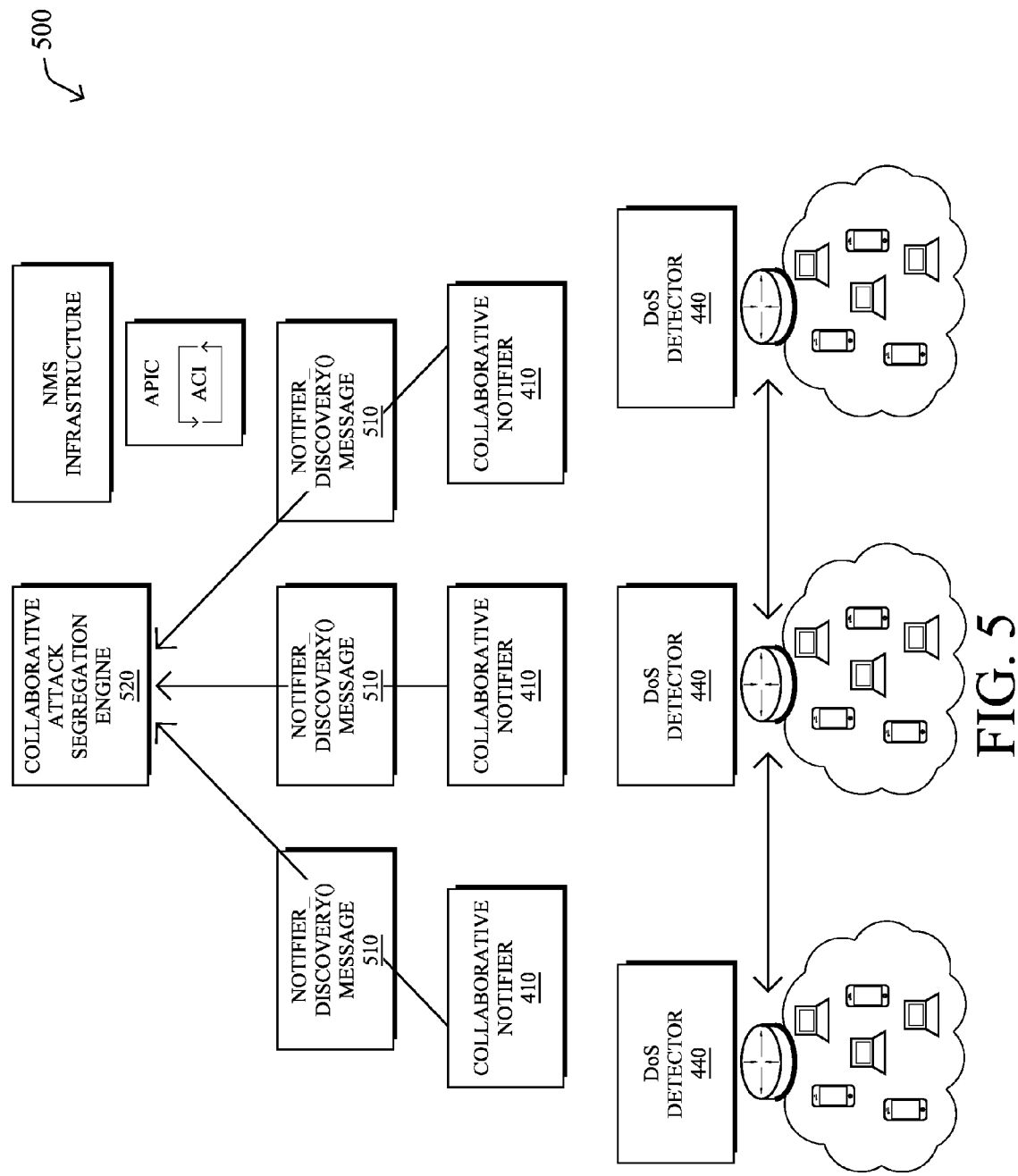
FIG. 5 illustrates an example diagrammatic representation of discovering collaborative group node candidates.

Referring now to FIG. 5, in order to assist in the formation of a collaborative group of nodes having DoS attack detection and mitigation capabilities, a message (e.g., Notifier_Discovery( ) message 510) may be sent from multiple CNs 410 toward a centralized entity node (e.g., collaborative attack segregation engine (CASE) 520). In particular, the Notifier_Discovery( ) message 510, as shown in FIG. 5, may include the following characteristics:

1. Nature of the Segregator: the Notifier_Discovery( ) message 510 may specify the specific ML technique used for performing traffic segregation on the respective device (e.g., a clustering technique, a supervised statistical model, etc.).
2. List of supported attacks: the Notifier_Discovery( ) message 510 may specify the list of attacks supported by the local DoS detector 440, such as Slow Loris, HTTP Recursive GET, and so forth. Also, the message may specify whether the local DoS detector 440 is capable of detecting potential attacks for which it has not been trained, in the event that the DoS detector 440 supports LM-based techniques for automatically creating LM-based signatures for unknown attacks, for example.
3. Networking scope: the Notifier_Discovery( ) message 510 may indicate the network scope for the device that hosts the segregator, or in other words, the network areas on which the particular CN 410 has visibility. For example, if the device is a FAR attached to two PANs, it may include the PAN IDs. If the node is an Area Border Router, it may list the set of OSPF areas it is attached to. Similarly if the device is an ASBR, it may indicate the set of local Autonomous Systems (AS).
4. Averaged convergence time (ACT): the Notifier_Discovery( ) message 510 may indicate the ACT of the local traffic segregator 420, where the ACT is an indicator of past convergence time. Indeed, performing traffic segregation may be a complex task involving a number of ML-based algorithms, and consequently, the performance of the segregator may vary by orders of magnitude among segregators according to the degree of sophistication of their algorithms, amount of memory, computing capabilities, etc. The ACT may be a simple scalar (e.g., weighted average convergence time) or a vector of scalars reflecting the convergence time, degree of success, and so forth.

Regarding the transmission of the Notifier_Discovery( ) message 510, several modes of operation are specified. In a first mode of operation, as shown in FIG. 5, each device equipped with a CN 410 may send the Notifier_Discovery( ) message 510 to a centralized entity node called the Collaborative Attack Segregation Engine (CASE) 520. The CASE 520 may be hosted on a NMS or a Network Controller (NC). Upon receiving the Notifier_Discovery( ) message, the CASE 520 may determine a set of devices that would benefit from the collaboration techniques described herein.

To this end, the CASE 520 can select the set of CNs 410 whose capabilities intersect. Put another way, the CNs 410 may be selected based on having a respective local DoS attack detection and mitigation system (e.g., elements with capabilities that are complementary to the other local DoS attack detection and mitigation systems. For example, the set S of collaborative nodes may be selected such that the widest variety of traffic segregators 420 is used, e.g., mixing fast or slow convergence time. Also, the CASE 520 can select CNs 410 by avoiding bad performers while ensuring that the network scopes are compatible, since, for example, it is less likely that two very distant PANs will detect the same attack at the same time. Similarly, two distant autonomous system boundary routers (ASBR) may not benefit from such a collaboration if they are connected to autonomous systems (AS) with highly different characteristics. In yet another embodiment, the CASE 520 may make use of historical information.

Namely, the recording of simultaneous attacks (which may be retrieved from a DoS attack historical database) may be used to group notifiers should the probability that these devices be exposed to the same attack cross some threshold. Notably, it may be determined that the capabilities of the DoS attack detection and mitigation systems (e.g., elements 420, 430, 440 and 450) of the various CNs 410 are complementary to one another using any suitable approach, technique, or algorithm, as determined by the CASE 520 or the nodes themselves, such that the resources and capabilities of one CN 410 may complement, bolster, enhance, etc. those of another CN 410 within the same collaborative group.

Figure 6:
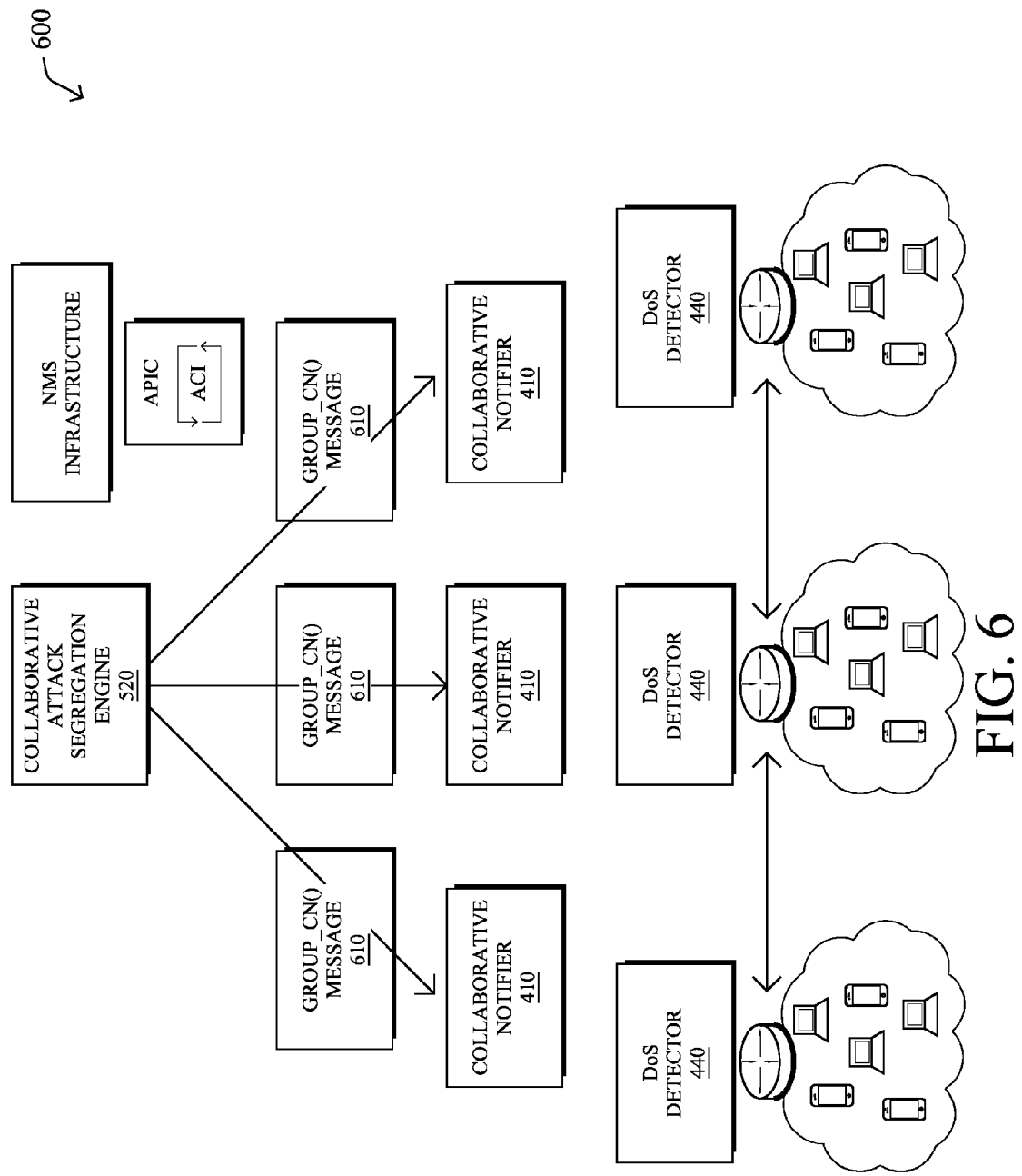
FIG. 6 illustrates an example diagrammatic representation of a collaborative group selection announcement.

Referring now to FIG. 6, once the groups of CNs 410 have been computed, the CASE 520 may subsequently send a notification message (e.g., the Group_CN( ) message 610) comprising a set of IDs of each selected CN 410, along with a multicast group address used during the collaborative mode described below. It may be possible for each group of collaborative CNs to be constantly re-adjusted according to the nodes' capabilities (which may be static or dynamic such as the amount of available memory) and their performance. For example, the CASE 520 may determine that a CN 410 is performing poorly and may be detrimental to the other CNs. In this case, the poorly performing CN 410 can be removed from the collaborative group, or conversely, notified that it has to join a new collaborative group in listening mode (i.e., receiving the list of flagged traffic but not providing its own computed set of flagged traffic). In yet another embodiment, the CASE 520 may take the network topology into account when computing the group of collaborative CNs 410. For example, in the case of the Internet of Things, CNs 410 may be grouped according to a set of available resources, should the devices hosting the CNs 410 be interconnected with sparse connectivity resources.

In a second mode of operation, the CNs 410 may publish their capabilities using the Notifier_Discovery( ) message 510 described above by sending the message 510 to a well-known multicast address (which may be retrieved during a DHCP process or locally configured, as an example). By doing so, the selection of CNs 410 to join the collaborative group may be performed in a distributed fashion, rather than at a single centralized entity (e.g., CASE 520). That is, each node that sends the Notifier_Discovery( ) message 510 can determine the group of collaborative CNs 410. Notably, the distributed approach may lead to less optimal groupings unless each node is equipped with enough information (e.g., routing information, topology information, etc.) in order to agree on a common selection of CNs 410 and capable of dynamically selecting a multicast group per set of collaborative CNs 410. Accordingly, in a completely distributed instantiation, each of the CNs 410 will autonomously select which other CN or CNs it will cooperate with. Since not all of the CNs 410 have the capabilities (nor the available topology and routing information) for choosing an optimal set, it is possible that some of them may select a sub-optimal solution.

Figure 7:
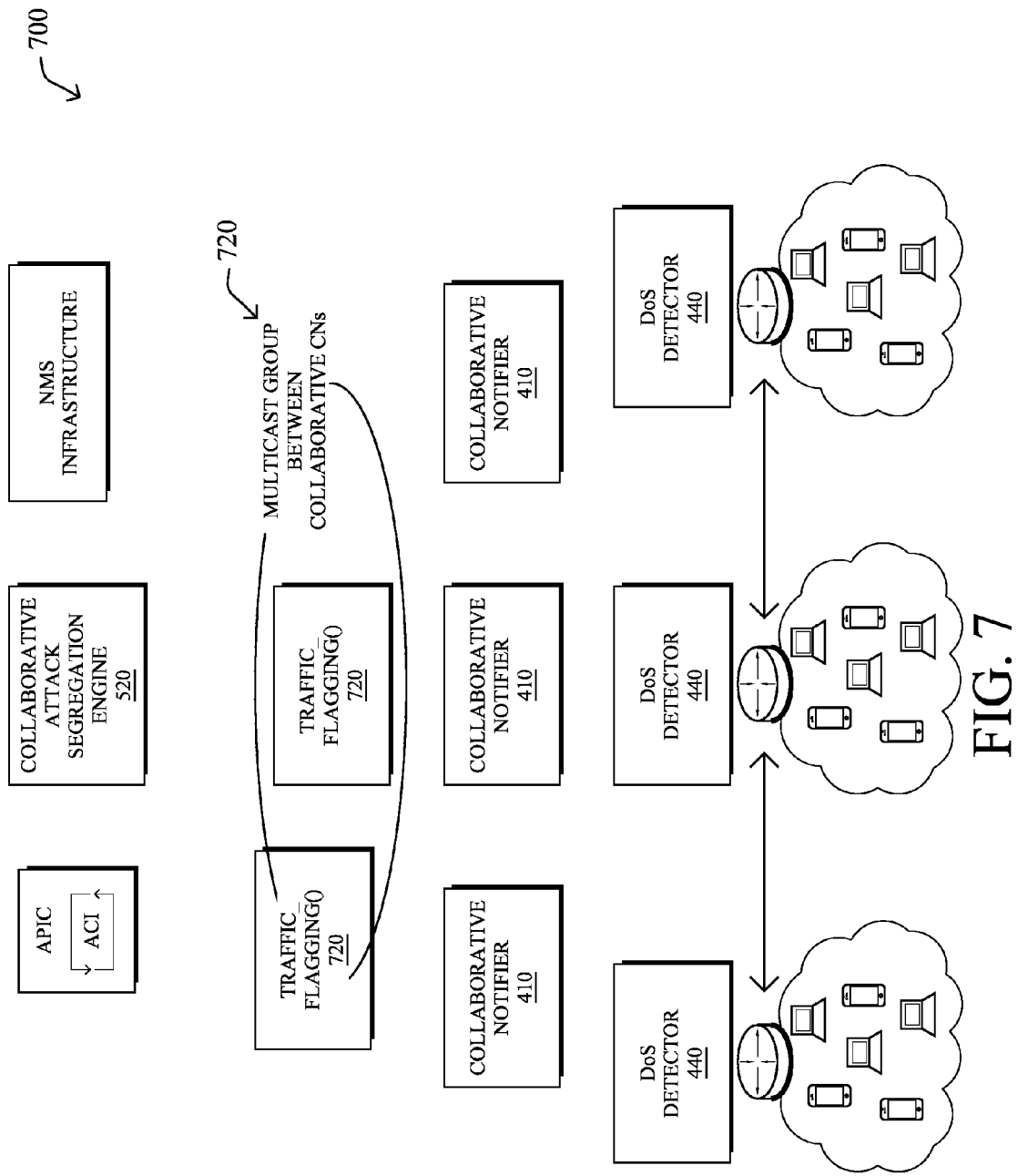
FIG. 7 illustrates an example diagrammatic representation of a collaborative flagging process.

Referring now to FIG. 7, another component of this disclosure involves the collaborative flagging/segregation process. At this point, groups of collaborating CNs 410 have been computed and a multicast group 710 has been assigned, either using the CASE 520 or the distributed mode of operation. Once an attack is detected by a particular node and the CN 410 corresponding to the particular node has computed a set of flows Fi, . . . , Fn marked as potentially attacking flows, the CN 410 may publish the set of flagged flows using a multicast message (e.g., the Traffic_Flagging( ) message 720) sent to the multicast group 710, such that the flows become available to all of the other CNs 410 that are a part of the same collaborative group. The Traffic_Flagging( ) message 720 may indicate the following:

1. Set of flows F1, . . . , Fn: In one embodiment, the entire traces for each flow may be indicated in the message 720. In another embodiment, a subset of these flows (e.g., samples) may be indicated in the message 720. In yet another embodiment, the CN 410 may compute a model (e.g., a Mixed Gaussian Model or the like) for one or more of the flows, and the computed model may be indicated in the message 720.
2. Degree of confidence: A degree of confidence in the respective CN's flagged data flows actually corresponding to attack traffic can also be indicated in the message 720. The degree of confidence may be represented via a normalized vector that provides an indication (when available) of both the confidence of the DoS detector 440, but also the performance of the segregator 420, thus indicating how confident is the CN 410 is in its ability to detect a true attack and segregate the attacking flows.
3. Origin of the attack: Assuming the information is available, the network ID of the DoS attack's origin can be indicated in the message 720. For example, if the device is a FAR attached to two PANs, it may include the PAN ID. If the node is an Area Border Router, it may list the open shortest path first (OSPF) areas where the segregated traffic has been detected.

In another component of this disclosure, feedback may be sent either to each CN 410 in the collaborative groups or to the CASE 520. The feedback may be provided in a feedback message (e.g., Feed-Back( )). This message may specify the accelerating factor on this collaborative mode, i.e., the amount of by which the traffic segregation has been accelerated due to the collaborative efforts. Such a factor may help the CASE 520, for example, in further group assignments. Indeed, a local device hosting a segregator module 420 may be able, upon reception of a Traffic-Flagging( ) message 720 comprising a flagged attacking flow, to determine whether or not it had identified a corresponding cluster.

In particular, the information included in the Traffic_Flagging( ) message 720 can allow the CN 410 to check whether it is, in fact, observing malicious traffic and whether its classifier is detecting it. This allows computing a performance index for the local classifier against an established background truth. This feedback information can further be used in order to optimize the group assignment of CNs 410. It can also be used by the CN 410 for determining whether its local LM classifier is no longer capable of detecting attacks. In such a case, the CN 410 can raise an alarm for requesting a retraining of the local LM.

Figure 8:
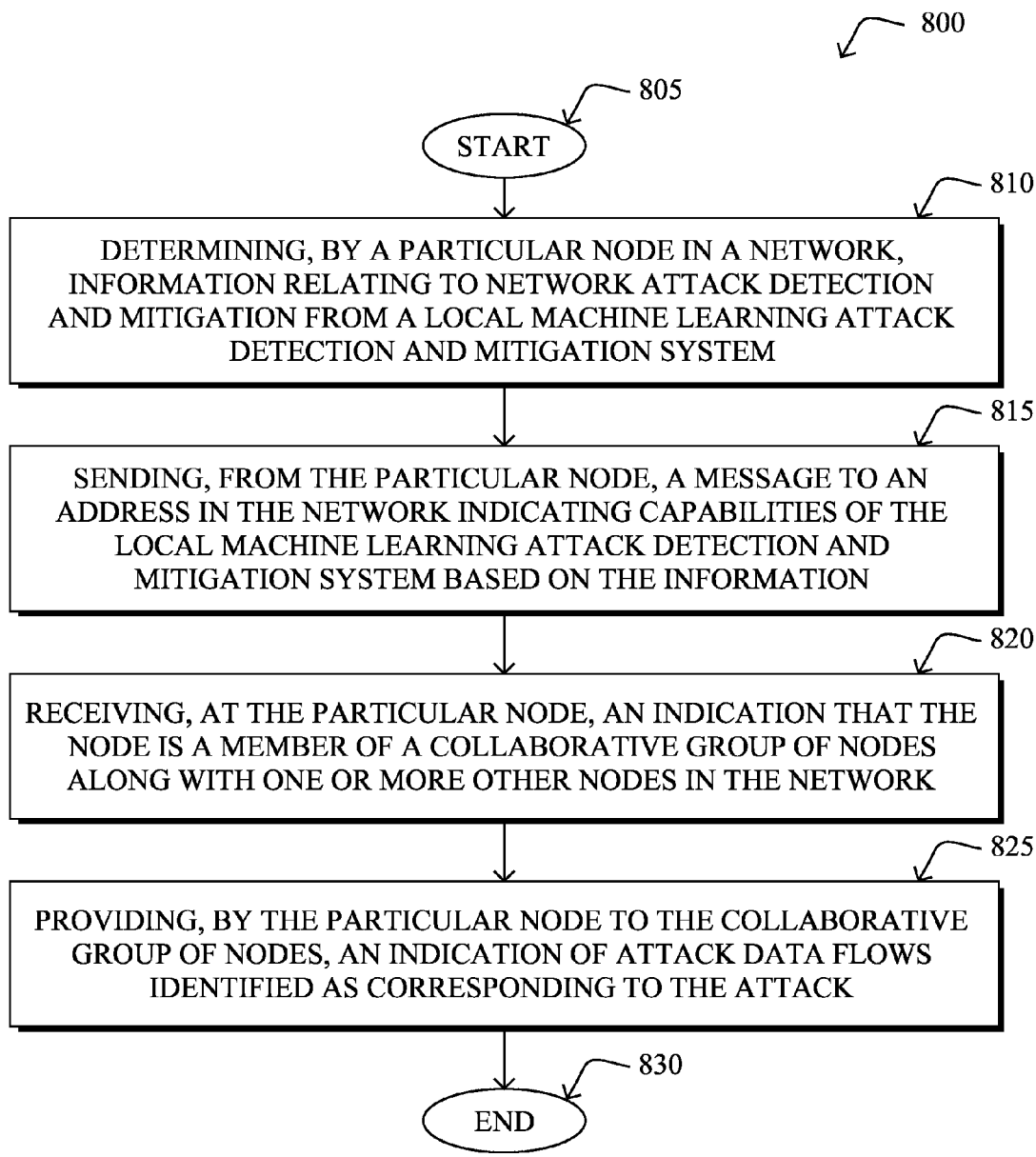
FIG. 8 illustrates an example simplified procedure for participating in a collaborative attack detection and mitigation group.

FIG. 8 illustrates an example simplified procedure for participating in a collaborative attack detection and mitigation group in accordance with one or more embodiments described herein. The procedure 800 may start at step 805, and continues to step 810, where, as described in greater detail above, a node in a network (e.g., any of controllers/servers 102 or nodes/devices 104 shown in FIG. 1) having a local DoS attack detection and mitigation system may be selected as a member in a collaborative group with other nodes in the network, where every node in the collaborative group has a respective local DoS attack detection and mitigation system. Thus, every node in that group may assist one another when performing attack traffic segregation, thereby increasing a quality and efficiency of the segregation process.

At step 810, a particular node in a network determines information relating to network attack detection and mitigation from a local machine learning attack detection and mitigation system. The particular node may host multiple modules, including, but not limited to, CN 410, segregator 420, aggregator 430, attack detector 440, and/or DRC 450, as shown in FIG. 4. As explained above, the CN 410 is operable to communicate with other network entities, including collaborating with other CNs in the network. The machine learning attack detection and mitigation system may include the segregator 420, aggregator 430, attack detector 440, and/or DRC 450. Thus, the machine learning attack detection and mitigation system is local to the CN 410, as it is hosted on the same node (e.g., the "particular node") as the CN 410.

At step 815, the particular node sends a message to an address in the network indicating capabilities of the local machine learning attack detection and mitigation system based on the information. The address may be, for example, an address of the CASE 520 or a multicast group address accessible by other CNs in the same collaborative group. The capabilities of the machine learning attack detection and mitigation system that is local to the particular node may involve, for example, one or more of: i) an attack traffic segregation technique used by the local machine learning attack detection and mitigation system, ii) a list of attacks that are detectable by the local machine learning attack detection and mitigation system, iii) a connectivity range of the local machine learning attack detection and mitigation system in the network, and/or iv) an average convergence time when the local machine learning attack detection and mitigation system performs attack traffic segregation.

In response to the sent message, at step 820, the particular node receives an indication that the node is a member of a collaborative group of nodes along with one or more other nodes in the network. The determination of the collaborative group of nodes may be based on the capabilities of the local machine learning attack detection and mitigation system being complementary to capabilities of one or more other machine learning attack detection and mitigation systems local to the one or more other nodes. The determination may be made by the CASE 520 or the nodes in the network themselves, where the determination is made in a distributed fashion. Further, the indication may be received via the Group_CN( ) message 610, as shown in FIG. 6.

At step 825, in response to an attack being detected by the local machine learning attack detection and mitigation system, the particular node provides to the collaborative group of nodes an indication of attack data flows identified as corresponding to the attack. To this end, the particular node may send the attack data flows to the multicast group 710, as shown in FIG. 7, which is shared and accessible by all of the nodes in the collaborative group of nodes. Therefore, the one or more other machine learning attack detection and mitigation systems local to the one or more other nodes are enabled to assist the particular node in mitigating the attack. As a result, the mitigation (e.g., segregation) of attack traffic can be enhanced due to the contribution of increased resources from the machine learning attack detection and mitigation systems local to other nodes in the collaborative group, as described in more detail above.

The procedure illustrative ends at step 830. The techniques by which the steps of procedure 800 may be performed, as well as ancillary procedures and parameters, are described in detail above.

Figure 9:
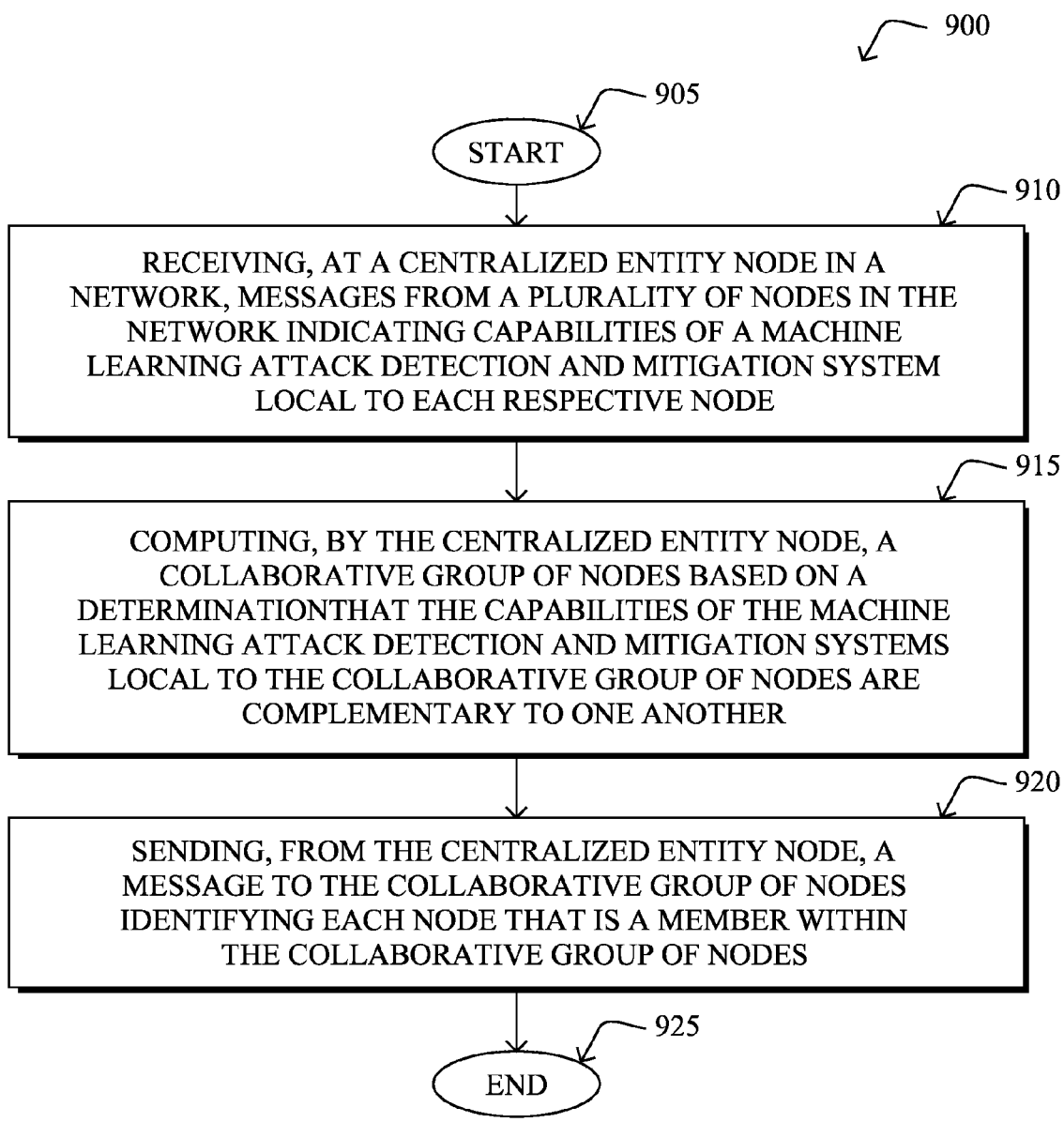
FIG. 9 illustrates an example simplified procedure for determining a collaborative attack detection and mitigation group.

FIG. 9 illustrates an example simplified procedure for determining a collaborative attack detection and mitigation group in accordance with one or more embodiments described herein. The procedure 900 may start at step 905, and continues to step 910, where, as described in greater detail above, a centralized entity node in a network (e.g., any of controllers/servers 102 or nodes/devices 104 shown in FIG. 1) computes a collaborative group of nodes based on a determination that the capabilities of the machine learning attack detection and mitigation systems local to the collaborative group of nodes are complementary to one another, thereby enabling the machine learning attack detection and mitigation systems local to the collaborative group of nodes to assist one another in mitigating attacks in the network.

At step 910, a centralized entity node in a network receives messages from a plurality of nodes in the network indicating capabilities of a machine learning attack detection and mitigation system local to each respective node. For example, the centralized entity node may correspond to the CASE 520. The received messages may be sent via the Notifier_Discovery( ) message 510, as shown in FIG. 5.

At step 915, in response to the received messages, the centralized entity node computes a collaborative group of nodes based on a determination that the capabilities of the machine learning attack detection and mitigation systems local to the collaborative group of nodes are complementary to one another. For example, the set S of collaborative nodes may be selected such that the widest variety of traffic segregators 420 is used, e.g., mixing fast or slow convergence time. Also, the CASE 520 can select CNs 410 by avoiding bad performers while ensuring that the network scopes are compatible, since, for example, it is less likely that two very distant PANs will detect the same attack at the same time. Similarly, two distant autonomous system boundary routers (ASBR) may not benefit from such a collaboration if they are connected to autonomous systems (AS) with highly different characteristics. In yet another embodiment, the CASE 520 may make use of historical information. Namely, the recording of simultaneous attacks (which may be retrieved from a DoS attack historical database) may be used to group notifiers should the probability that these devices be exposed to the same attack cross some threshold.

Notably, it may be determined that the capabilities of the DoS attack detection and mitigation systems (e.g., elements 420, 430, 440 and 450) of the various CNs 410 are complementary to one another using any suitable approach, technique, or algorithm, as determined by the CASE 520 or the nodes themselves, such that the resources and capabilities of one CN 410 may complement, bolster, enhance, etc. those of another CN 410 within the same collaborative group. Accordingly, the machine learning attack detection and mitigation systems local to the collaborative group of nodes are enabled to assist one another in mitigating attacks in the network.

At step 920, the centralized entity node may send a message to the collaborative group of nodes identifying each node that is a member within the collaborative group of nodes. The message may be sent via the Group_CN( ) message 610, as shown in FIG. 6.

The procedure illustratively ends at step 925, though notably may begin again in response to receiving a feedback message indicating a degree to which the detecting and mitigating of an attack in the network has been enhanced due to the collaborative group of nodes. That is, the centralized entity node may re-compute the collaborative group of nodes based on the received feedback message by restarting procedure 900. Note also that the techniques by which the steps of procedure 900 may be performed, as well as ancillary procedures and parameters, are described in detail above.

It should be noted that while certain steps within procedures 800 and 900 may be optional, the steps shown in FIGS. 8 and 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800 and 900 are described separately, certain steps from each procedure may be incorporated into each other procedure, and the procedures are not meant to be mutually exclusive.

The techniques described herein, therefore, offer a number of advantages in using the above collaborative techniques, including: 1) dramatically improving the overall performance of traffic segregation (i.e., identification of attacking traffic); 2) allowing low-end nodes to benefit from higher end (e.g., performance-wise) nodes equipped with more sophisticated traffic flagging techniques; 3) reducing the required processing time for nodes due to traffic identification (which may itself be an attack where the attack may want to purposely trigger heavy computation to steal network CPU resources from the device).

While there have been shown and described illustrative embodiments that provide for traffic segregation in a DDoS attack architecture, it is to be understood that various other adaptations and modifications may be made within the spirit and scope of the embodiments herein. For example, while the techniques herein are described primarily with respect to DoS and DDoS attacks, the techniques herein may also be adapted for use with for any type network attack. In addition, while certain networks and topologies are described herein, the techniques may be applied more generally to any form of computer network.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a communication network, a processor coupled to the at least one network interface, and a memory configured to store program instructions executable by the processor. Further, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a particular node in a network, information relating to network attack detection and mitigation from a local machine learning attack detection and mitigation system;
   sending, from the particular node, a message to an address in the network indicating capabilities of the local machine learning attack detection and mitigation system based on the information;
   in response to the sent message, receiving, at the particular node, an indication that the node is a member of a collaborative group of nodes along with one or more other nodes in the network based on the capabilities of the local machine learning attack detection and mitigation system being complementary to capabilities of one or more other machine learning attack detection and mitigation systems local to the one or more other nodes; and
   in response to an attack being detected by the local machine learning attack detection and mitigation system, providing, by the particular node to the collaborative group of nodes, an indication of attack data flows identified as corresponding to the attack, thereby enabling the one or more other machine learning attack detection and mitigation systems local to the one or more other nodes to assist the particular node in mitigating the attack.

2. The method as in claim 1, wherein the capabilities of the local machine learning attack detection and mitigation system involve one or more of: i) an attack traffic segregation technique used by the local machine learning attack detection and mitigation system, ii) a list of attacks that are detectable by the local machine learning attack detection and mitigation system, iii) a connectivity range of the local machine learning attack detection and mitigation system in the network, and iv) an average convergence time when the local machine learning attack detection and mitigation system performs attack traffic segregation.

3. The method as in claim 1, wherein the sending of the message indicating capabilities of the local machine learning attack detection and mitigation system comprises:
   sending, from the particular node, the message to a centralized entity node in the network that is configured to compute the collaborative group of nodes based on a determination that the capabilities of the local machine learning attack detection and mitigation system are complementary to the capabilities of the one or more other machine learning attack detection and mitigation systems local to the one or more other nodes.

4. The method as in claim 1, wherein the sending of the message indicating capabilities of the local machine learning attack detection and mitigation system comprises:
   sending, from the particular node, the message to an address in the network that is within communication range of other nodes in the network,
   wherein the node and the other nodes are configured to compute the collaborative group of nodes based on a determination that the capabilities of the local machine learning attack detection and mitigation system are complementary to the capabilities of the one or more other machine learning attack detection and mitigation systems local to the one or more other nodes.

5. The method as in claim 1, wherein the providing of the indication of the attack data flows to the collaborative group comprises:
   sending, from the particular node, a multicast message indicating the attack data flows to an address in the network that is within communication range of the collaborative group of nodes, thereby enabling the collaborative group of nodes to access the multicast message.

6. The method as in claim 1, further comprising:
   in response to the attack being detected by the local machine learning attack detection and mitigation system, providing, by the particular node to the collaborative group of nodes, an indication of one or more of i) a degree of confidence in the local machine learning attack detection and mitigation system's ability to detect and mitigate the attack and ii) an origin of the attack.

7. The method as in claim 1, further comprising:
   sending, from the particular node, a feedback message indicating a degree to which the detecting and mitigating of the attack has been enhanced due to the collaborative group of nodes.

8. The method as in claim 1, further comprising:

receiving an indication of attack data flows identified as corresponding to a detected attack from a node of the collaborative group of nodes; and assisting the node in mitigating the attack data flows using a local machine learning attack detection and mitigation system.

9. A method, comprising:

receiving, at a centralized entity node in a network, messages from a plurality of nodes in the network indicating capabilities of a machine learning attack detection and mitigation system local to each respective node;

in response to the received messages, computing, by the centralized entity node, a collaborative group of nodes based on a determination that the capabilities of the machine learning attack detection and mitigation systems local to the collaborative group of nodes are complementary to one another, wherein the machine learning attack detection and mitigation systems local to the collaborative group of nodes are enabled to assist one another in mitigating attacks in the network; and sending, from the centralized entity node, a message to the collaborative group of nodes identifying each node that is a member within the collaborative group of nodes.

10. The method as in claim 9, wherein the capabilities of the machine learning attack detection and mitigation system involve one or more of: i) an attack traffic segregation technique used by the machine learning attack detection and mitigation system, ii) a list of attacks that are detectable by the machine learning attack detection and mitigation system, iii) a connectivity range of the machine learning attack detection and mitigation system in the network, and iv) an average convergence time when the machine learning attack detection and mitigation system performs attack traffic segregation.

11. The method as in claim 9, further comprising:

receiving, at the centralized entity node, a feedback message indicating a degree to which the detecting and mitigating of an attack in the network has been enhanced due to the collaborative group of nodes; and re-computing, by the centralized entity node, the collaborative group of nodes based on the received feedback message.

12. The method as in claim 9, wherein the determination that the capabilities of the machine learning attack detection and mitigation systems local to the collaborative group of nodes are complementary to one another is based on one or more of the following factors: i) a relationship between attack traffic segregation techniques used by the machine learning attack detection and mitigation systems, ii) a relationship between attacks that are detectable by the machine learning attack detection and mitigation systems, iii) a relationship between connectivity ranges of the machine learning attack detection and mitigation systems in the network, and iv) a relationship between average convergence times when the machine learning attack detection and mitigation systems perform attack traffic segregation.

13. An apparatus, comprising:

one or more network interfaces to communicate with a network;

a processor coupled to the one or more network interfaces and configured to execute a process; and a memory configured to store program instructions which include the process executable by the processor, the process comprising:

determining, as a particular node in the network, information relating to network attack detection and mitigation from a local machine learning attack detection and mitigation system;

sending, from the particular node, a message to an address in the network indicating capabilities of the local machine learning attack detection and mitigation system based on the information;

in response to the sent message, receiving, at the particular node, an indication that the node is a member of a collaborative group of nodes along with one or more other nodes in the network based on the capabilities of the local machine learning attack detection and mitigation system being complementary to capabilities of one or more other machine learning attack detection and mitigation systems local to the one or more other nodes; and in response to an attack being detected by the local machine learning attack detection and mitigation system, providing, by the particular node to the collaborative group of nodes, an indication of attack data flows identified as corresponding to the attack, thereby enabling the one or more other machine learning attack detection and mitigation systems local to the one or more other nodes to assist the particular node in mitigating the attack.

14. The apparatus as in claim 13, wherein the capabilities of the local machine learning attack detection and mitigation system involve one or more of: i) an attack traffic segregation technique used by the local machine learning attack detection and mitigation system, ii) a list of attacks that are detectable by the local machine learning attack detection and mitigation system, iii) a connectivity range of the local machine learning attack detection and mitigation system in the network, and iv) an average convergence time when the local machine learning attack detection and mitigation system performs attack traffic segregation.

15. The apparatus as in claim 13, wherein the sending of the message indicating capabilities of the local machine learning attack detection and mitigation system comprises:

sending, from the particular node, the message to a centralized entity node in the network that is configured to compute the collaborative group of nodes based on a determination that the capabilities of the local machine learning attack detection and mitigation system are complementary to the capabilities of the one or more other machine learning attack detection and mitigation systems local to the one or more other nodes.

16. The apparatus as in claim 13, wherein the sending of the message indicating capabilities of the local machine learning attack detection and mitigation system comprises:

sending, from the particular node, the message to an address in the network that is within communication range of other nodes in the network, wherein the node and the other nodes are configured to compute the collaborative group of nodes based on a determination that the capabilities of the local machine learning attack detection and mitigation system are complementary to the capabilities of the one or more other machine learning attack detection and mitigation systems local to the one or more other nodes.

17. The apparatus as in claim 13, wherein the providing of the indication of the attack data flows to the collaborative group comprises:

sending, from the particular node, a multicast message indicating the attack data flows to an address in the network that is within communication range of the collaborative group of nodes, thereby enabling the collaborative group of nodes to access the multicast message.

18. The apparatus as in claim 13, wherein the process further comprises:
in response to the attack being detected by the local machine learning attack detection and mitigation system, providing, by the particular node to the collaborative group of nodes, an indication of one or more of i) a degree of confidence in the local machine learning attack detection and mitigation system's ability to detect and mitigate the attack and ii) an origin of the attack.

19. The apparatus as in claim 13, wherein the process further comprises:
sending, from the particular node, a feedback message indicating a degree to which the detecting and mitigating of the attack has been enhanced due to the collaborative group of nodes.

20. The apparatus as in claim 19, wherein the process further comprises:
receiving an indication of attack data flows identified as corresponding to a detected attack from a node of the collaborative group of nodes; and
assisting the node in mitigating the attack data flows using a local machine learning attack detection and mitigation system.

21. An apparatus, comprising:
one or more network interfaces to communicate with a network;
a processor coupled to the one or more network interfaces and configured to execute a process; and
a memory configured to store program instructions which include the process executable by the processor, the process comprising:
receiving, as a centralized entity node in the network, messages from a plurality of nodes in the network indicating capabilities of a machine learning attack detection and mitigation system local to each respective node;
in response to the received messages, computing, by the centralized entity node, a collaborative group of nodes based on a determination that the capabilities of the machine learning attack detection and mitigation systems local to the collaborative group of nodes are complementary to one another, wherein the machine learning attack detection and mitigation systems local to the collaborative group of nodes are enabled to assist one another in mitigating attacks in the network; and
sending, from the centralized entity node, a message to the collaborative group of nodes identifying each node that is a member within the collaborative group of nodes.

22. The apparatus as in claim 21, wherein the capabilities of the machine learning attack detection and mitigation system involve one or more of: i) an attack traffic segregation technique used by the machine learning attack detection and mitigation system, ii) a list of attacks that are detectable by the machine learning attack detection and mitigation system, iii) a connectivity range of the machine learning attack detection and mitigation system in the network, and iv) an average convergence time when the machine learning attack detection and mitigation system performs attack traffic segregation.

23. The apparatus as in claim 21, wherein the process further comprises:
receiving, at the centralized entity node, a feedback message indicating a degree to which the detecting and mitigating of an attack in the network has been enhanced due to the collaborative group of nodes; and
re-computing, by the centralized entity node, the collaborative group of nodes based on the received feedback message.

24. The apparatus as in claim 21, wherein the determination that the capabilities of the machine learning attack detection and mitigation systems local to the collaborative group of nodes are complementary to one another is based on one or more of the following factors: i) a relationship between attack traffic segregation techniques used by the machine learning attack detection and mitigation systems, ii) a relationship between attacks that are detectable by the machine learning attack detection and mitigation systems, iii) a relationship between connectivity ranges of the machine learning attack detection and mitigation systems in the network, and iv) a relationship between average convergence times when the machine learning attack detection and mitigation systems perform attack traffic segregation.

* * * * *